(12) United States Patent
Song et al.

(10) Patent No.: US 10,050,813 B2
(45) Date of Patent: Aug. 14, 2018

(54) LOW COMPLEXITY SEQUENCE ESTIMATOR FOR GENERAL PACKET RADIO SERVICE (GPRS) SYSTEM

(71) Applicant: Samsung Electronics Co., Ltd., Gyeonggi-do (KR)

(72) Inventors: Kee-Bong Song, San Diego, CA (US); Charles Pandana, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/390,132

(22) Filed: Dec. 23, 2016

(65) Prior Publication Data

US 2018/0115440 A1    Apr. 26, 2018

Related U.S. Application Data

(60) Provisional application No. 61/412,444, filed on Oct. 25, 2016.

(51) Int. Cl.
H04L 25/03       (2006.01)
H04L 27/22       (2006.01)
H04L 1/00        (2006.01)

(52) U.S. Cl.
CPC ...... H04L 25/03057 (2013.01); H04L 1/0054 (2013.01); H04L 27/22 (2013.01)

(58) Field of Classification Search
CPC .. H04L 25/03057; H04L 1/0054; H04L 27/22
See application file for complete search history.

(56) References Cited

U.S. PATENT DOCUMENTS 6,185,259 B1 *   2/2001   Dent ................. H04L 1/0054
                                                  332/100
6,470,047 B1    10/2002   Kleinerman et al.
7,003,055 B2     2/2006   Sexton
7,330,505 B2     2/2008   Fitton et al.
7,363,576 B2     4/2008   Azadet et al.
7,450,634 B2    11/2008   Miller et al.
8,180,228 B1     5/2012   Harlet et al.
8,279,954 B2    10/2012   Papadopoulos et al.
8,295,340 B2    10/2012   Wang et al.
8,565,329 B2    10/2013   Papadopoulos et al.
8,831,074 B2     9/2014   Agazzi et al.
9,071,344 B2     6/2015   Smee et al.
(Continued)

OTHER PUBLICATIONS

Guan, Xiangsheng et al., High-Speed Structure of Channel Estimation and Equalization for 60 GHz SC-FDE Transmission ICCP2013 Proceedings, Copyright 2013 IEEE, pp. 211-214.

Wu, Jianjun, Iterative Reduced-State Equalisation, VTC2000, Copyright 2000 IEEE, pp. 1694-1697.

Zhang, Ye et al., Low-Effort High-Performance Viterbi-based Receiver for Bluetooth LE Applications, Copyright 2013 IEEE, pp. 1930-1933.

(Continued)

*Primary Examiner* — Syed Haider

(74) *Attorney, Agent, or Firm* — The Farrell Law Firm, P.C.

(57) ABSTRACT

A method and apparatus are provided. The method includes receiving, by a user equipment (UE), a phase shift keying (PSK) modulated signal from a transceiver, derotating the PSK modulated signal, and equalizing the PSK modulated signal using a maximum likelihood sequence estimator (MLSE) based on a first main tap gain (MTG) look up table (LUT) and a first inter-symbol interference (ISI) LUT corresponding to even time samples and a second MTG LUT and a second ISI LUT corresponding to odd time samples.

21 Claims, 8 Drawing Sheets

(56) References Cited

U.S. PATENT DOCUMENTS

| | | | |
|---|---|---|---|
| 2002/0083396 A1* | 6/2002 | Azadet | H03M 13/03 714/796 |
| 2003/0115541 A1* | 6/2003 | Azadet | H03M 13/256 714/796 |
| 2004/0085917 A1 | 5/2004 | Fitton et al. | |
| 2006/0203943 A1* | 9/2006 | Scheim | H04L 1/0045 375/341 |
| 2014/0226707 A1* | 8/2014 | Kaviani | H04L 25/03063 375/233 |
| 2015/0003221 A1* | 1/2015 | Sankaranarayanan | G11B 20/10046 369/13.32 |
| 2016/0218752 A1 | 7/2016 | Liu | |

OTHER PUBLICATIONS

Nickel, Patrick et al., Cochannel Interference Cancellation using Optimized Joint Equalization, Proceedings of the 2007 IEEE International Conference on Telecommunications and Malaysia International Conference in Communications, May 14-17, 2007, Penang, Malaysia, Copyright 2007 IEEE, pp. 450-454.

Haratsch, Erich F. at al., High-Speed Reduced-State Sequence Estimation, ISCAS 2000, IEEE International Symposium on Circuits and Systems, May 28-31, 2000 Geneva, Switzerland, Copyright 2000 IEEE, pp. 387-390.

Myburgh, HC et al., Near-Optimal Low Complexity MLSE Equalization, 2008 IEEE Wireless Communications and Networking Conference, IEEE 2008, pp. 5.

* cited by examiner

LOW COMPLEXITY SEQUENCE ESTIMATOR FOR GENERAL PACKET RADIO SERVICE (GPRS) SYSTEM

PRIORITY

This application claims priority under 35 U.S.C. § 119(e) to U.S. Provisional Patent Application No. 62/412,444 which was filed in the U.S. Patent and Trademark Office on Oct. 25, 2016, the entire content of which is incorporated herein by reference.

FIELD

The present disclosure generally relates to a method and apparatus, and more particularly, to a method and apparatus for a low complexity sequence estimator for a general packet radio service (GPRS) system and enhanced data rates for Global System for Mobile Communication (GSM) evolution (EDGE) system.

BACKGROUND

In a general packet radio service system (GPRS) network, the system capacity is limited by co-channel interference (CCI) due to frequency reuse. Since the majority of users in a second generation (2G) communication system use voice service, users using packet data service are often limited by Gaussian minimum shift keying (GMSK) interference.

Users of electronic devices require increasing functionality and performance in applications, services and the communication networks used by electronic devices. 2G and second and a half generation (2.5G) networks such as GPRS and EDGE provide high network service coverage and modest bandwidths for many users of electronic devices. In a GPRS network, the system capacity is limited by CCI due to frequency reuse. To further increase spectral efficiency, high-order modulation such as 8 phase shift keying (8 PSK) was adopted in 2G and 2.5G systems in which 3 bits are transmitted in each phase shift. The introduction of high-order modulation increases the complexity of receivers which use maximum likelihood sequence estimation (MLSE). Methods and apparatuses which reduce the complexity of MLSE based receivers for 8 PSK modulation systems may reduce the cost and power consumption of electronic devices while increasing the network performance of the electronic devices.

SUMMARY

An aspect of the present disclosure provides a phase rotated modification of a conventional MLSE receiver for 8 PSK modulation with single antenna interference cancellation (SAIC) processing and a method to reduce the complexity of an MLSE receiver, such as reduced branch sequence estimation (RBSE) and reduced state sequence estimation (RSSE).

According to an aspect of the present disclosure, a method is provided which includes receiving, by a user equipment (UE), a phase shift keying (PSK) modulated signal from a transceiver, derotating the PSK modulated signal, and equalizing the PSK modulated signal using a maximum likelihood sequence estimator (MLSE) based on a first main tap gain (MTG) look up table (LUT) and a first inter-symbol interference (ISI) LUT corresponding to even time samples and a second MTG LUT and a second ISI LUT corresponding to odd time samples.

According to another aspect of the present disclosure, an apparatus is provided which includes a processor and a receiver configured to receive a phase shift keying (PSK) modulated signal from a transceiver, derotate the PSK modulated signal, input the PSK modulated signal to a maximum likelihood sequence estimation (MLSE) equalizer, wherein the MLSE equalizer includes a first main tap gain (MTG) look up table (LUT) and a first inter-symbol interference (ISI) LUT corresponding to even time samples, and a second MTG LUT and a second ISI LUT corresponding to odd time samples.

According to another aspect of the present disclosure, a method of manufacturing a processor is provided which includes forming the processor as part of a wafer or package that includes at least one other processor, wherein the processor is configured to receive, by a user equipment (UE), a phase shift keying (PSK) modulated signal from a transceiver, derotate the PSK modulated signal, form a virtual inter-symbol interference channel by means of mono interference cancellation (MIC) and branch combining (BRC) processing, input the PSK modulated signal to a phase-rotated maximum likelihood sequence estimator (MLSE) equalizer, wherein the MLSE equalizer includes a first main tap gain (MTG) look up table (LUT) and a first inter-symbol interference (ISI) LUT corresponding to even time samples and a second MTG LUT and a second ISI LUT corresponding to odd time samples, reduce one of a branch sequence estimation and a state sequence estimation in the MLSE equalizer, and determine a soft symbol based on the one of the reduced branch sequence estimation and the reduced state sequence estimation in the MLSE equalizer.

According to another aspect of the present disclosure, a method of constructing an integrated circuit is provided, which includes generating a mask layout for a set of features for a layer of the integrated circuit, wherein the mask layout includes standard cell library macros for one or more circuit features that include a processor configured to receive, by a user equipment (UE), a phase shift keying (PSK) modulated signal from a transceiver, derotate the PSK modulated signal, form a virtual inter-symbol interference channel by means of mono interference cancellation (MIC) and branch combining (BRC) processing, input the PSK modulated signal to a phase-rotated maximum likelihood sequence estimator (MLSE) equalizer, wherein the MLSE equalizer includes a first main tap gain (MTG) look up table (LUT) and a first inter-symbol interference (ISI) LUT corresponding to even time samples and a second MTG LUT and a second ISI LUT corresponding to odd time samples, reduce one of a branch sequence estimation and a state sequence estimation in the MLSE equalizer, and determine a soft symbol based on the one of the reduced branch sequence estimation and the reduced state sequence estimation in the MLSE equalizer.

BRIEF DESCRIPTION OF THE DRAWINGS

The above and other aspects, features and advantages of the present disclosure will become more apparent from the following detailed description, when taken in conjunction with the accompanying drawings, in which.

DETAILED DESCRIPTION

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly a second signal may be referred to as a first signal without departing from the teachings of the disclosure.

The terminology used herein is for the purpose of describing particular embodiments only and is not intended to limit the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including, but not limited to" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including, but not limited to technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

Figure 1:
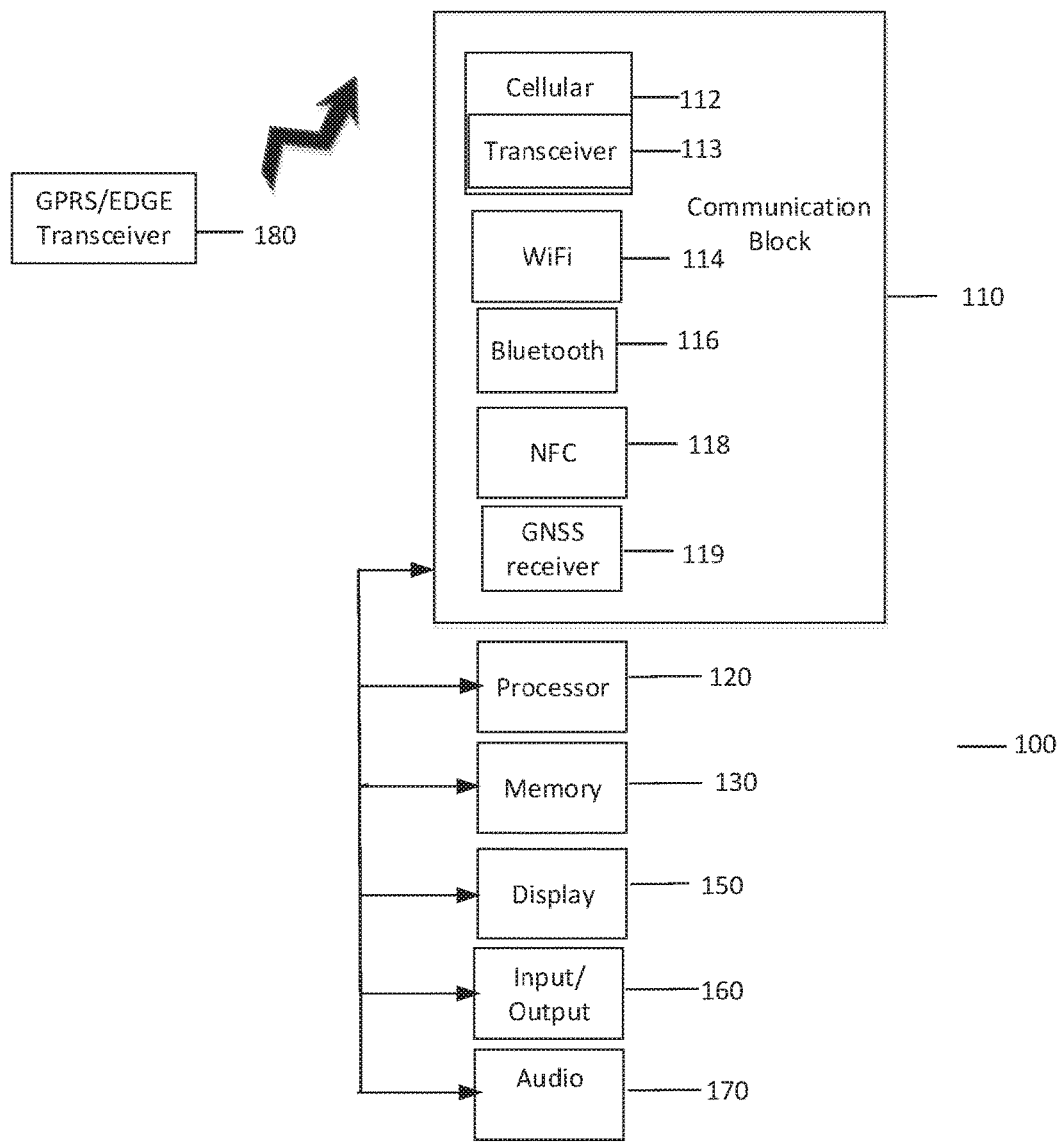
FIG. 1 is a block diagram of an electronic device in a communication network, according to an embodiment of the present disclosure.

FIG. 1 is a block diagram of an electronic device in a network environment, according to an embodiment of the present disclosure.

Referring to FIG. 1, an electronic device 100 includes, but is not limited to, a communication block 110, a processor 120, a memory 130, a display 150, an input/output block 160, an audio block 170 and a GPRS/EDGE transceiver 180. The GPRS/EDGE transceiver 180 may be included in a cellular base station and includes, but is not limited to, a wireless transmitter and receiver.

The electronic device 100 includes a communication block 110 for connecting the device 100 to another electronic device or a network for communication of voice and data. The communication block 110 provides GPRS, EDGE, cellular, wide area, local area, personal area, near field, device to device (D2D), machine to machine (M2M), satellite, enhanced mobile broad band (eMBB), massive machine type communication (mMTC), ultra-reliable low latency communication (URLLC), narrowband Internet of things (NB-IoT) and short range communications. The functions of the communication block 110, or a portion thereof including a transceiver 113, may be implemented by a chipset. In particular, the cellular communications block 112 provides a wide area network connection through terrestrial base transceiver stations or directly to other electronic devices, using technologies such second generation (2G), GPRS, EDGE, D2D, M2M, long term evolution (LTE), fifth generation (5G), long term evolution advanced (LTE-A), code division multiple access (CDMA), wideband code division multiple access (WCDMA), universal mobile telecommunications system (UMTS), wireless broadband (WiBro), and global system for mobile communication (GSM). The cellular communications block 112 includes, but is not limited to, a chipset and the transceiver 113. The transceiver 113 includes, but is not limited to, a transmitter and a receiver. The wireless fidelity (WiFi) communications block 114 provides a local area network connection through network access points using technologies such as IEEE 802.11. The Bluetooth communications block 116 provides personal area direct and networked communications using technologies such as IEEE 802.15. The near field communications (NFC) block 118 provides point to point short range communications using standards such as ISO/IEC 14443. The communication block 110 also includes a GNSS receiver 119. The GNSS receiver 119 may support receiving signals from a satellite transmitter.

The electronic device 100 may receive electrical power for operating the functional blocks from a power supply, including, but not limited to a battery. The GPRS/EDGE transceiver 180 may be a part of a terrestrial base transceiver station (BTS) (such as a cellular base station) and include a radio frequency transmitter and receiver conforming to third generation partnership project (3GPP) standards. The GPRS/EDGE transceiver 180 may provide data and voice communications services to users of mobile user equipment (UE). In the present disclosure, the term "UE" may be used interchangeably with the term "electronic device".

The processor 120 provides application layer processing functions required by the user of the electronic device 100. The processor 120 also provides command and control functionality for the various blocks in the electronic device 100. The processor 120 provides for updating control functions required by the functional blocks. The processor 120 may provide for coordination of resources required by the transceiver 113 including, but not limited to, communication control between the functional blocks. The processor 120 may also update the firmware, databases, lookup tables, calibration method programs and libraries associated with the cellular communications block 112. The cellular communications block 112 may also have a local processor or a chipset which dedicates computing resources to cellular communications block 112 and other functional blocks such as MLSE receivers for cellular communication.

The memory 130 provides storage for device control program code, user data storage, application code and data storage. The memory 130 may provide data storage for the firmware, libraries, databases, lookup tables, algorithms, methods, MLSE parameters, and calibration data required by the cellular communications block 112. The program code and databases required by the cellular communications block 112 may be loaded into local storage within the cellular communications block 112 from the memory 130 upon device boot up. The cellular communications block 112 may also have local, volatile and non-volatile memory for storing the program code, libraries, databases, calibration data and lookup table data.

The display 150 may be a touch panel, and may be embodied as a liquid crystal display (LCD), organic light emitting diode (OLED) display, active matrix OLED (AMOLED) display, and the like. The input/output block 160 controls the interface to the user of the electronic device 100. The audio block 170 provides for audio input and output to/from the electronic device 100.

The GPRS/EDGE transceiver 180 may be included in a base station that is used to receive, transmit or relay wireless signals. The GPRS/EDGE transceiver 180 may facilitate communication with the electronic device 100 by sending, receiving, and relaying data communication signals to and from the electronic device 100. The electronic device 100 may be connected to a network through the GPRS/EDGE transceiver 180. For example, the GPRS/EDGE transceiver 180 may be a cell tower, a wireless router, an antenna, multiple antennas, or a combination thereof being used to send signals to, or receive signals from, the electronic device 100, such as a smartphone. The GPRS/EDGE transceiver 180 may relay the wireless signals through the network to enable communication with other electronic devices 100 such as user equipment (UE), servers or a combination thereof. The GPRS/EDGE transceiver 180 may be used to transmit the communication signals, such as voice or data.

According to an embodiment of the present disclosure, a method and apparatus are provided for a phase-rotated MLSE modification of an 8-phase shift keying (PSK) modulation receiver with single antenna interference cancelation (SAIC) processing. In particular, the method and apparatus provide a low complexity implementation of phase-rotated MLSE using a reduced branch, reduced state MLSE with soft output metric/soft decision, and a log-likelihood ratio (LLR) saturation process.

Figure 2:
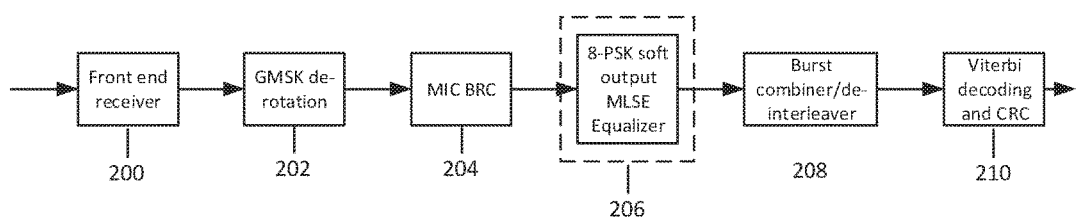
FIG. 2 is a block diagram of a wireless receiver which implements maximum likelihood sequence estimation (MLSE) for 8 PSK modulation with SAIC processing, according to an embodiment of the present disclosure.

FIG. 2 is a block diagram of a wireless receiver which implements maximum likelihood sequence estimation (MLSE) for 8 PSK modulation with SAIC processing, according to an embodiment of the present disclosure.

According to an embodiment of the present disclosure, the present system and method provides an MLSE implementation for 8 PSK modulation with SAIC processing as shown in FIG. 2. Referring to FIG. 2, the front end receiver module 200 may include a surface acoustic wave (SAW) filter which provide a narrow pass band filter for incoming RF signals, a low noise amplifier (LNA) for amplifying the incoming low-power RF signals without significantly degrading its signal-to-noise ratio, duplexer(s), switch(es) and impedance matching component(s). The Gaussian minimum shift keying (GMSK) derotation module 202 operates on an incoming GMSK signal from the front end receiver module 200 to perform a de-rotation of pi/2 per symbol in the GMSK signal. The MIC BRC module 204 provides mono interference cancellation (MIC) and branch combining (BRC). The 8 PSK soft output MLSE equalizer module 206 provides a low complexity implementation of a phase-rotated MLSE equalizer using a reduced branch or reduced state MLSE with soft output metric/soft decision, and a log-likelihood ratio (LLR) saturation process. The burst combiner/deinterleaver module 208 combines the soft bits received from the 8 PSK soft output MLSE equalizer module 206 and deinterleaves the combined soft bits. The Viterbi decoding and CRC module 210 uses a Viterbi algorithm to decode the bits received from the burst combiner/deinterleaver module 208 and the cyclic redundancy check (CRC) provides error checking by computing a cyclic code on the decoded bits and comparing the resulting check value with the transmitted check value in order to determine errors in data transmission.

A signal model of an 8 PSK modulated signal with GMSK interference and channel length L+1, may be represented by Equation (1) as follows:

$$\tilde{r}[t] = \sum_{l=0}^{L} \tilde{h}[l]a[t-l]e^{j\phi(t-l)} + \underbrace{\sum_{m=0}^{L} \tilde{g}[m]b[t-m]e^{j\theta(t-m)} + \tilde{w}[t]}_{\tilde{n}[t]} \quad (1)$$

where a[t] is an 8 PSK modulated signal with a phase rotation of $$\phi = \frac{3\pi}{8},$$

and b[t] is a GMSK modulated signal with a phase rotation of $$\theta = \frac{\pi}{2},$$

$\tilde{h}[l]$ is the channel experienced by the 8 PSK modulated signal, $\tilde{g}[m]$ is the channel experienced by the GMSK interferer signal, and $\tilde{w}[t]$ is the additive white Gaussian noise (AWGN).

A signal model of an 8 PSK modulated signal with GMSK interference in a receiver which performs single antenna interference cancellation (SAIC) with a phase de-rotation of $$\theta = -\frac{\pi}{2})$$

may be represented by Equation (2) as follows:

$$r[t] = \tilde{r}[t]e^{-j\theta t} = \sum_{l=0}^{L} \tilde{h}[l]e^{-j\theta l}a[t-l]e^{j(\phi-\theta)(t-l)} + \sum_{m=0}^{L} \tilde{g}[m]e^{-j\theta m}b[t-m] + \tilde{w}[t]e^{-j\theta t}r[t] = \sum_{l=0}^{L} h[l]\tilde{a}[t-l] + \underbrace{\sum_{m=0}^{L} g[m]b[t-m] + w[t]}_{n[t]} \quad (2)$$

where $\tilde{a}[t]=a[t]e^{j(\phi-\theta)t}$, $h[l]=\tilde{h}[l]e^{-j\theta l}$, $g[m]=\tilde{g}[m]e^{-j\theta m}$, $b[t]$ is a GMSK modulated signal with a phase rotation of $$\theta = \frac{\pi}{2}, \text{ and } w[t] = \tilde{w}[t]e^{-j\theta t}.$$

Based on algebraic manipulation, Equation (2) may be rewritten for both in-phase and quadrature (I and Q) signals and represented by Equation (3) as follows:

$$\begin{bmatrix} r_I[t] \\ r_Q[t] \end{bmatrix} = Re\left\{ e^{j(\phi-\theta)t} \sum_{l=0}^{L} \tilde{h}_c[l]a[t-l] \right\} + \begin{bmatrix} n_I[t] \\ n_Q[t] \end{bmatrix} \quad (3)$$

where $\tilde{h}_c[l] = \left[ \begin{pmatrix} h_I[l] \\ h_Q[l] \end{pmatrix} + j \begin{pmatrix} h_Q[l] \\ -h_I[l] \end{pmatrix} \right] e^{-j(\phi-\theta)(l)}.$ A similar expression to Equation (3) above, may be obtained with SAIC processing and represented by Equation (4) as follows:

$$y_T[t] = Pr[t] = \sum_{l=0}^{Q_d} H_{res}[l] \begin{bmatrix} \tilde{a}_I[t-l] \\ \tilde{a}_Q[t-l] \end{bmatrix} + e_T[t] = Re\left\{ e^{j(\phi-\theta)t} \sum_{l=0}^{Q_d} \tilde{h}_{res,c}[l]a[t-l] \right\} + e_T[t] \quad (4)$$

The method of equalization, using a maximum likelihood sequence estimation (MLSE) method, determines the sequence of symbols that is most likely to have been transmitted by the GPRS/EDGE transceiver 180. The task of sequence estimation is to find the sequence that minimizes the function defined in Equation (5) below or an MLSE estimate of the function defined in Equation (5) below:

$$\hat{a}[t] = \underset{a}{\mathrm{argmin}} \sum_{t} \left\| y[t] - Re\left\{ e^{j(\phi-\theta)t} \sum_{l=0}^{Q_d} \tilde{h}_c[l]a[t-l] \right\} \right\|^2 \quad (5)$$

where $\phi = \frac{3\pi}{8}, \theta = \frac{\pi}{2}.$

Equation (5) may be rewritten by expanding $y[t]=[y_1[t], \ldots, y_B[t]]^T$ and $\tilde{h}_c[l]=[\tilde{h}_{c,1}[l], \ldots, \tilde{h}_{c,B}[l]]^T$, where B is the number of virtual intersymbol interference (ISI) channels and b is the virtual channel index (b=1, ..., B) and may be represented by Equation (6) as follows:

$$\hat{a}[t] = \underset{a}{\mathrm{argmin}} \sum_{t} \sum_{b=1}^{B} \left| y_b[t] - Re\left\{ e^{j(\phi-\theta)t} \sum_{l=0}^{Q_d} \tilde{h}_{c,b}[l]a[t-l] \right\} \right|^2 \quad (6)$$

Equation (6) above requires a time varying trellis state due to $e^{j(\phi-\theta)t}$. In a MLSE implementation, channel estimation is first performed. After performing the channel estimation, the estimated channel is assumed to be fixed for the entire burst and a Viterbi algorithm finds the sequence a[t] minimizing the following:

$$\underset{a}{\mathrm{argmin}} \sum_{t} \left| r[t] - \sum_{l=0}^{L} h[l]a[t-l] \right|^2,$$

where r[l] is the received signal, h[l] is the estimated channel, and a[t–l] is the transmitted sequence. Equation (6) is equivalent to $$\hat{a}[t] = \underset{a}{\mathrm{argmin}} \sum_{t} \sum_{b=1}^{B} \left| y_b[t] - Re\left\{ \sum_{l=0}^{Q_d} \tilde{h}_{c,b}[l]a'[t-l] \right\} \right|^2,$$

where $a'[t-l] = e^{j(\phi-\theta)t}a[t-l].$ $\tilde{h}_{c,b}[l]$ is obtained from channel estimation and assumed to be fixed during the entire burst. The effect of $e^{j(\phi-\theta)t}$ on the transmitted signal is equivalent to solving the time varying trellis state since a'[t–l] represents the state of the trellis and is time varying according to a'[t–l]=$e^{j(\phi-\theta)t}$a[t–l].

Figure 3:
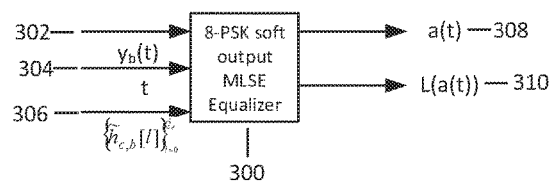
FIG. 3 illustrates a block diagram of a soft output MLSE equalizer, according to an embodiment of the present disclosure.

FIG. 3 illustrates a block diagram of an 8 PSK soft output MLSE equalizer, according to an embodiment of the present disclosure.

Referring to FIG. 3, the input Yb(t) 302 is a branch of the received signal created when performing mono interference cancellation and branch combining. In SAIC processing, B branches of parallel or independent channels are formed by whitening the received signal. The number of branches is a design parameter which trades off computational complexity with receiver performance. In an embodiment of the present disclosure, it is assumed that MIC-BRC has been performed and $y_1[t], \ldots, y_B[t]$ 302 have been calculated from MIC-BRC processing, the input t 304 provides a timing control signal to the 8 PSK soft output MLSE equalizer 300, the input $\{\tilde{h}_{c,b}[l]\}_{l=0}^{Q_d}$ 306 is obtained from MIC-BRC processing. The output a(t) 308 provides an 8 PSK constellation representing the symbols of highest probability and the output L(a(t)) 310 measures the reliability of the detected bits a(t) 308. The larger the amplitude of L(a(t)) 310 the more reliable decision a(t) 308 is. An L(a(t)) 310 that is close to zero indicates poor reliability of the decision a(t) 308.

Figure 4:
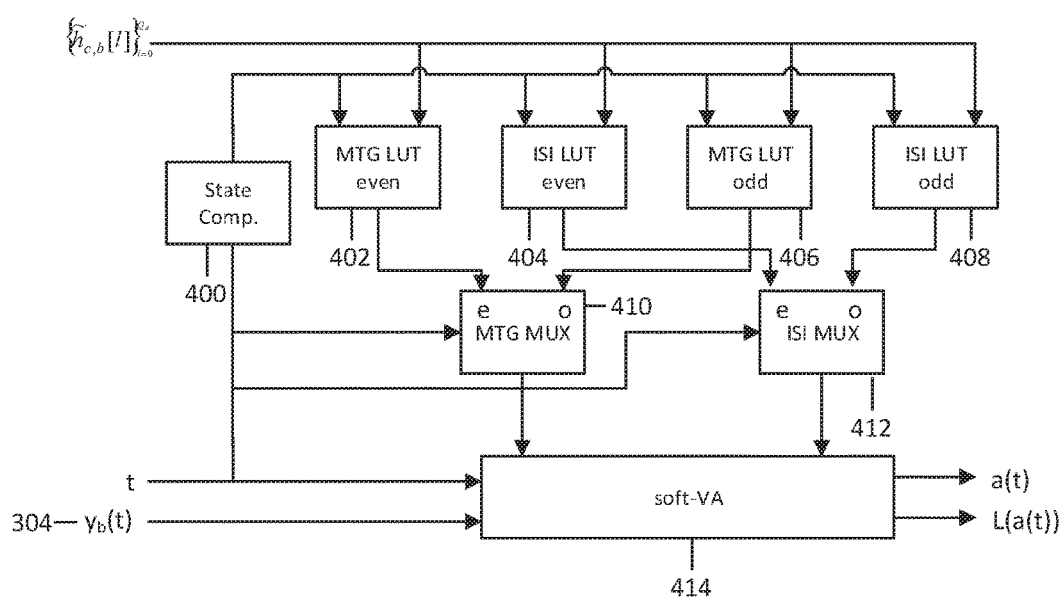
FIG. 4 illustrates a detailed block diagram of an 8 PSK soft output MLSE equalizer, according to an embodiment of the present disclosure.

FIG. 4 illustrates a detailed block diagram of an 8 PSK soft output MLSE equalizer, according to an embodiment of the present disclosure.

According to an embodiment of the present disclosure, the present system provides a look-up table (LUT) based implementation of a modified MLSE for 8 PSK modulation with SAIC processing. Referring to FIG. 4, the input t 304 is a control signal used to select between even main tap gain (MTG) LUT 402 values, even intersymbol interference (ISI) LUT 404 values, odd MTG LUT 406 values, and odd ISI LUT 408 values. Control signal t 304 also determines the correct indices of the states as calculated in the state computation module 400 and provides a timing signal to the soft Viterbi algorithm (VA) module 414. The state computation module 400 computes the time-varying state by derotating the input state by a multiple of $$\frac{\pi}{4}.$$

The multiplicity of $$\frac{\pi}{4}$$

derotation is time dependent. The soft VA module 414 executes a soft Viterbi algorithm. The Viterbi algorithm finds the most likely sequence of symbols (the Viterbi path) that results in a sequence of symbols. Since $$\phi - \theta = -\frac{\pi}{8}$$

and a[t] is an 8 PSK constellation in the form of $$e^{j\frac{\pi}{4}I[t]},$$

actual time-varying complex multiplication does not have to be performed, since the state computation module 400 will calculate the correct derotation accordingly. The present system may generate two sets of LUTs, the first set corresponds to even time sample processing, and the second set corresponds to odd time sample processing. The even main tap gain (MTG) look up table (LUT) 402 determines the gain provided to the MTG multiplexor (MUX) 410 for the even time samples and the odd main tap gain (MTG) look up table (LUT) 406 determines the gain provided to the MTG multiplexor (MUX) 410 for the odd time samples. The even intersymbol interference (ISI) look up table (LUT) 404 determines the stored values provided to the ISI MUX 412 for the even time samples and the odd ISI LUT 408 determines the stored values provided to the ISI MUX 412 for the odd time samples. The MTG values for the even time samples may be represented by Equation (7) below and the MTG values for the odd time samples may be represented by Equation (8) below. The ISI values for the even time samples may be represented by Equation (9) below and the ISI values for the odd time samples may be represented by Equation (10) below as follows:

$$MTG_e(b, I[t]) = Re\{\tilde{h}_{c,b}[0]e^{j(\frac{\pi}{4})I[t]}\} \quad (7)$$

$$MTG_o(b, I[t]) = Re\{e^{-\frac{\pi}{8}}\tilde{h}_{c,b}[0]e^{j(\frac{\pi}{4})I[t]}\} \quad (8)$$

$$ISI_e(b, (I[t-1], \ldots, I[t-Q_d])) = Re\left\{\sum_{l=1}^{Q_d} \tilde{h}_{c,b}[l]e^{j(\frac{\pi}{4})I[t-l]}\right\} \quad (9)$$

$$ISI_o(b, (I[t-1], \ldots, I[t-Q_d])) = Re\left\{e^{-\frac{j\pi}{8}}\sum_{l=1}^{Q_d} \tilde{h}_{c,b}[l]e^{j(\frac{\pi}{4})I[t-l]}\right\} \quad (10)$$

The odd tables are derotated compared to the even tables by $$\frac{\pi}{8}.$$

The intersymbol interference may also be represented by Equation (11) below considering that $$e^{-\frac{j\pi}{4}n}e^{j(\frac{\pi}{4})I[t]}$$

is another 8 PSK symbol:

$$Re\left\{e^{-\frac{j\pi}{8}t}\sum_{l=0}^{Q_d} \tilde{h}_{c,b}[l]e^{j(\frac{\pi}{4})I[t-l]}\right\} = \quad (11)$$

$$\begin{cases} Re\left\{\sum_{l=1}^{Q_d} \tilde{h}_{c,b}[l](e^{-\frac{j\pi}{4}n}e^{j(\frac{\pi}{4})I[t-l]})\right\} & t \text{ is even} \\ Re\left\{e^{-\frac{j\pi}{8}}\sum_{l=1}^{Q_d} \tilde{h}_{c,b}[l](e^{-\frac{j\pi}{4}n}e^{j(\frac{\pi}{4})I[t-l]})\right\} & t \text{ is odd} \end{cases}$$

where $n = \left\lfloor \frac{t}{2} \right\rfloor$

An example of the equivalent path metric (PM) update for even/odd time sample processing in the tuple of states form for $Q_d=2$ may be represented by Equation (12) as follows:

$$PM(I[t], I[t-1]) = \quad (12)$$

$$\begin{cases} \min_{I[t-2]=(0,\ldots 7)} \left\{ \sum_{b=1}^{B} \left| \begin{array}{c} PM(I[t-1], I[t-2]) + \\ y_b[t] - MTG_e(b, m(I[t], n)) - \\ ISI_e(b, (m(I[t-1], n), \\ m(I[t-2], n))) \end{array} \right|^2 \right\} & t \text{ is even} \\ \min_{I[t-2]=(0,\ldots 7)} \left\{ \sum_{b=1}^{B} \left| \begin{array}{c} PM(I[t-1], I[t-2]) + \\ y_b[t] - MTG_o(b, m(I[t], n)) - \\ ISI_o(b, (m(I[t-1], n), \\ m(I[t-2], n))) \end{array} \right|^2 \right\} & t \text{ is odd} \end{cases}$$

The tuple of states is a concatenation of a series of states. For example, tuple of current state and previous states for $Q_d=2$ is represented as (I[t], I[t−1]). Similarly, for $Q_d$=3, the tuple of states is represented as (I[t], I[t−1], I[t−2]). The tuple representation may also be represented by a linear index as in Equation (13).

Similarly, the path metric (PM) update for even/odd time sample processing in a linear index may be represented by Equation (13) as follows:

$$PM(J[t]) = \begin{cases} \min_{J[t-1]} \left\{ PM(J[t-1]) + \sum_{b=1}^{B} |y_b[t] - MTG_e(b, I[t]) - ISI_e(b, J[t-1])|^2 \right\} & t \text{ is even} \\ \min_{J[t-1]} \left\{ PM(J[t-1]) + \sum_{b=1}^{B} |y_b[t] - MTG_o(b, I[t]) - ISI_o(b, J[t-1])|^2 \right\} & t \text{ is odd} \end{cases} \quad (13)$$

The relationship between J[t], I[t], and J[t−1] may be represented by Equations (14) and (15) as follows:

$$I[t] = m\left(\left\lfloor \frac{J[t]}{8} \right\rfloor, n\right) \quad (14)$$

$$J[t-1] = \{8 \times m(m(J[t], 0), n) + m(k, n), k = 0, \ldots, 7\} \quad (15)$$

By using odd and even time sample processing, the present system only requires correctly mapping the indices of the MTG/ISI LUTs as shown in Equations (14) and (15) above without re-computing the phase rotated versions of the LUTs for each instance. The LUTs need only be updated with new values whenever channel estimation is performed and the channel state information is updated.

According to an embodiment of the present disclosure, the present system provides RBSE to reduce the number of branch metric computations in the soft VA module 414, thereby reducing the add-compare-select (ACS) operations by dynamically selecting 2 out of the 8 branches going to each state.

Figure 5:
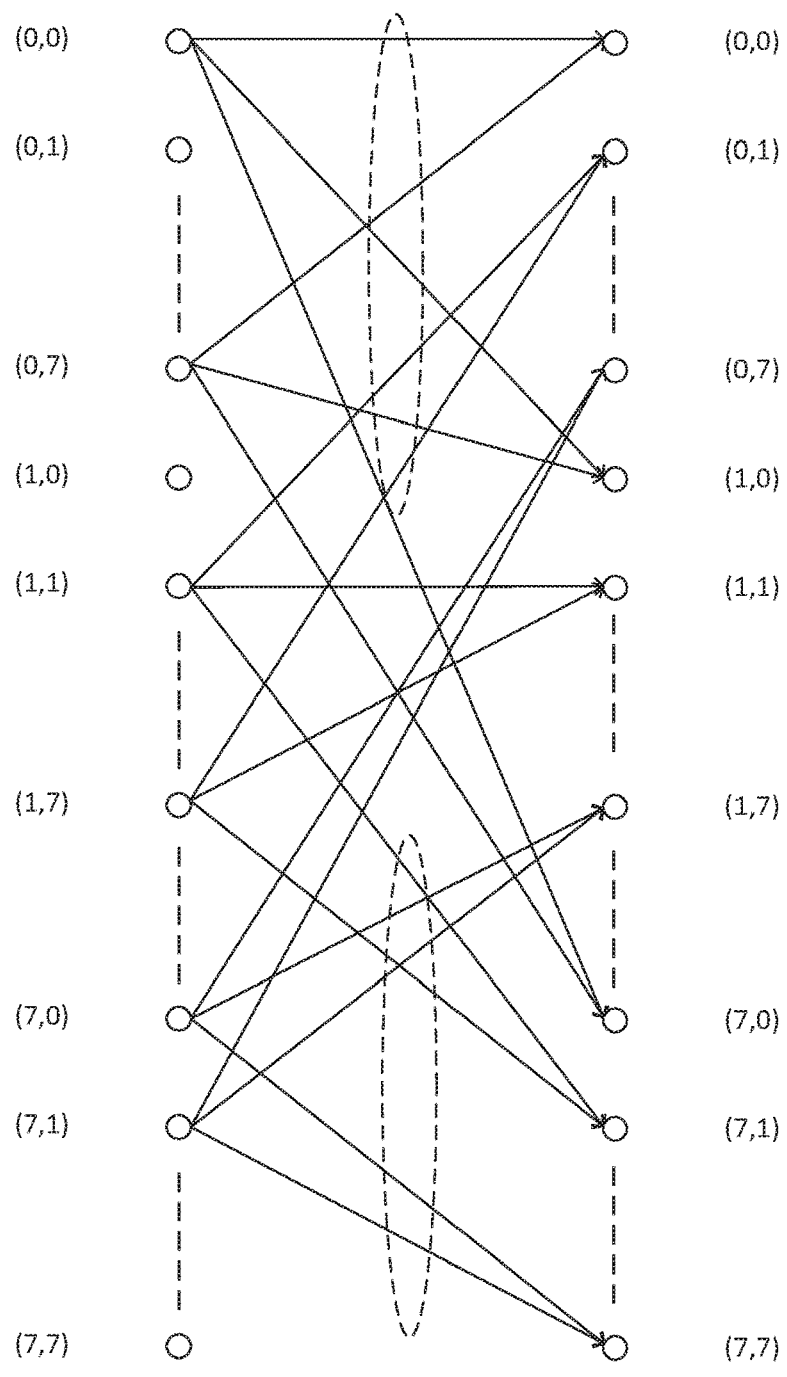
FIG. 5 illustrates a trellis diagram for reduced branch sequence estimation (RBSE) of a signal with 8 PSK modulation and a channel length $Q_d=2$, according to an embodiment of the present disclosure.

FIG. 5 illustrates a trellis diagram for RBSE of a signal with 8 PSK modulation and a multipath channel length $Q_d$=2, according to an embodiment of the present disclosure.

Referring to FIG. 5, the present system dynamically selects 2 out of the 8 branches as illustrated in trellis diagram 500. Only 2 branches may go to the next state from the previous state. The branches going to each next state are determined as follows:

Step 1: Select 2 candidate states to be evaluated (selected from previous states). Initially, the candidates may be chosen as Ĩ[t−2]∈{0,4}, for the next iteration the selection of candidates follows Equation (19) below.

Step 2: For each state, the present system determines 2 branch metrics based on the 2 candidate states.

Step 3: A reduced complexity implementation of the LUTs (tuple of states representation) in accordance with an embodiment of the present disclosure may be represented by Equation (17) as follows:

$$PM(I[t], I[t-1]) = \quad (17)$$

$$\begin{cases} \min_{I[t-2]\in\{0,4\}} \left\{ \sum_{b=1}^{B} \left| \begin{array}{c} PM(I[t-1], I[t-2]) + \\ y_b[t] - MTG_e(b, m(I[t], n)) - \\ ISI_e(b, (m(I[t-1], n), \\ m(I[t-2], n))) \end{array} \right|^2 \right\} & t \text{ is even} \\ \min_{I[t-2]\in\{0,4\}} \left\{ \sum_{b=1}^{B} \left| \begin{array}{c} PM(I[t-1], I[t-2]) + \\ y_b[t] - MTG_o(b, m(I[t], n)) - \\ ISI_o(b, (m(I[t-1], n), \\ m(I[t-2], n))) \end{array} \right|^2 \right\} & t \text{ is odd} \end{cases}$$

Step 4: From the current path metric, PM((0,0)), . . . , PM((7,7)), the present system selects the subsequent 2 candidate states from each state to be evaluated based on Equation (18) as follows:

$$\tilde{I}[t-1](I[t]) = \quad (18)$$

$$\left\{ \operatorname*{argmin}_{I[t-1]\in\{0,2,4,6\}} PM(I[t], I[t-1]), \operatorname*{argmin}_{I[t-1]\in\{1,3,5,7\}} PM(I[t], I[t-1]) \right\}$$

Step 5: Based on the evaluation of Equation (18) above, the present system determines 2 candidates for a fixed I[t] (which has a cardinality of 8). This set of 2 candidates (16 total candidates) are replicated to all the states based on Equation (19) as follows:

$$\tilde{I}[t-1]((I[t+1]=0,I[t]))=\tilde{I}[t-1]((I[t+1]=1,I[t]))=\ldots=\tilde{I}[t-1]((I[t+1]=7,I[t])) \quad (19)$$

Step 6: The present system increments t=t+1, as t increases, Ĩ[t−1] becomes Ĩ[t−2]. Repeat STEP 2 to STEP 6 until there are no more bits to be processed.

The soft VA module 414 takes into account the prior probabilities of the input symbols producing a soft output indicating the reliability of the decision. The soft decision made in the RBSE of each bit corresponds to the symbol and is calculated based on Equation (20) as follows:

$$L_i(b_i[t-\Delta]) = \min_{I[t], I[t-1]|b_i[t-\Delta]=0}(PM(I[t], I[t-1])) - \min_{I[t], I[t-1]|b_i[t-\Delta]=1}(PM(I[t], I[t-1])) \quad (20)$$

In the RBSE, the decision delay is selected to be Δ=1. In addition, the RBSE performs LLR saturation based on a mean absolute value of the soft decision, T, which improves overall performance as implemented by Equation (21) as follows:

$$\hat{L}_i(b_i[t]) = \max\{L_i(b_i[t]), 1.5T\} \quad (21)$$

The mean absolute value of the soft decision is computed based on Equation (22) as follows:

$$T = E[|L_i(b_i[t])|]. \quad (22)$$

According to an embodiment of the present disclosure, the present system provides RSSE with both naïve and low complexity LUT implementations. The partitioning of the symbols is based on Ungerboeck's set partition method used in trellis coded modulation (TCM). In the partition P=[$P_1$, $P_2$], the present system partitions the current symbols and the previous symbols into $P_1$ and $P_2$ partitions, respectively. In other words, I[t] is partitioned into 8 sets (which is the same as the original 8 PSK signal), and I[t−1] is partitioned to 2 sets, namely, {[0,2,4,6], [1,3,5,7]}.

Figure 6:
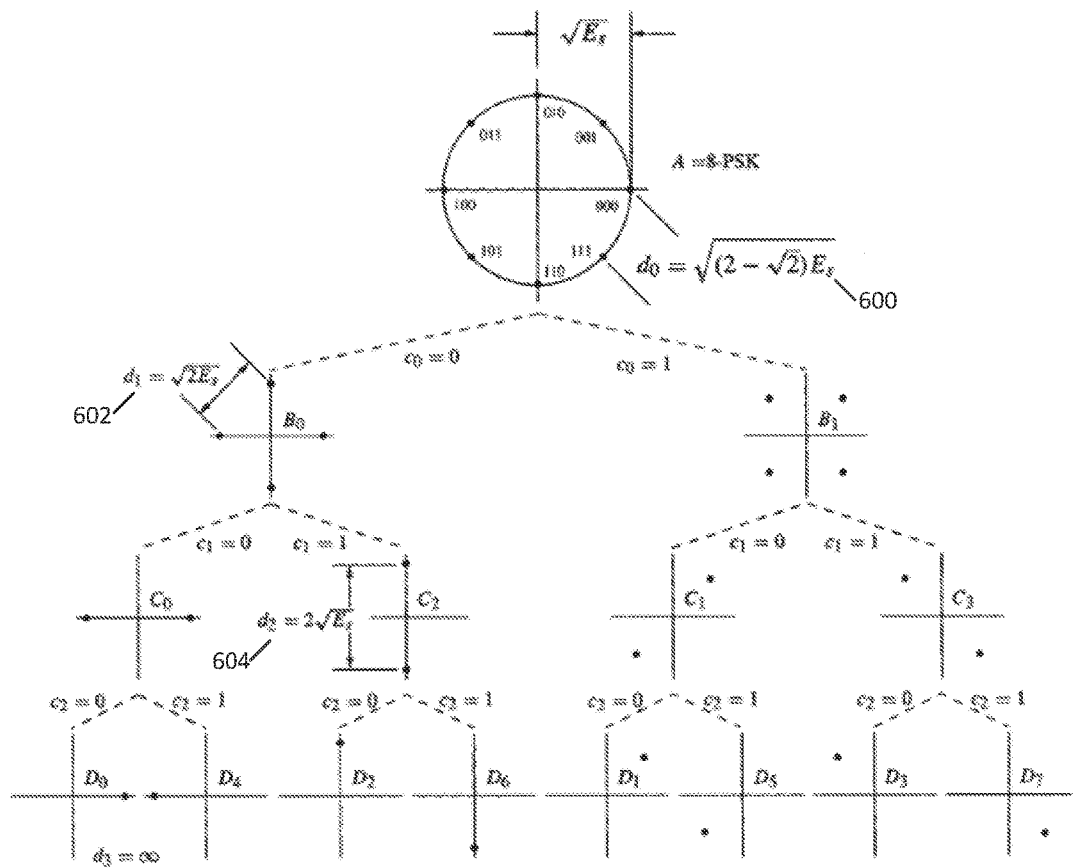
FIG. 6 illustrates a trellis diagram of symbol partitions of an 8 PSK signal, according to an embodiment of the present disclosure.

FIG. 6 illustrates a trellis diagram of symbol partitions of an 8 PSK signal, according to an embodiment of the present disclosure.

Referring to FIG. 6, the trellis diagram shows how the eight symbols of an 8 PSK signal are portioned into disjoint cosets such that the shortest Euclidian distances are increasing at each level of the trellis. There are four partitioned levels including the first unpartitioned set. At the first level 600 in which there are eight points, the Euclidian distance may be represented by Equation (23) as follows:

$$d_0 = \sqrt{(2-\sqrt{2})Es} \qquad (23)$$

At the next level down from the first level 600, the second level 602 has four points in each of the two cosets and the Euclidian distance between the points has increased and may be represented by Equation (24) as follows:

$$d_1 = \sqrt{2Es} \qquad (24)$$

At the next level down from the second level 602, the last level 604 has two points in each of the four cosets and the Euclidian distance between the points has increased and may be represented by Equation (25) as follows:

$$d_2 = 2\sqrt{Es} \qquad (25)$$

Due to the partitioning of the symbols, there is no longer a full trellis. According to an embodiment of the present disclosure, a modified trellis (sub-trellis) is shown in FIG. 7 for a partition of P=[8,2] and where the multipath channel length Q_d=2.

Figure 7:
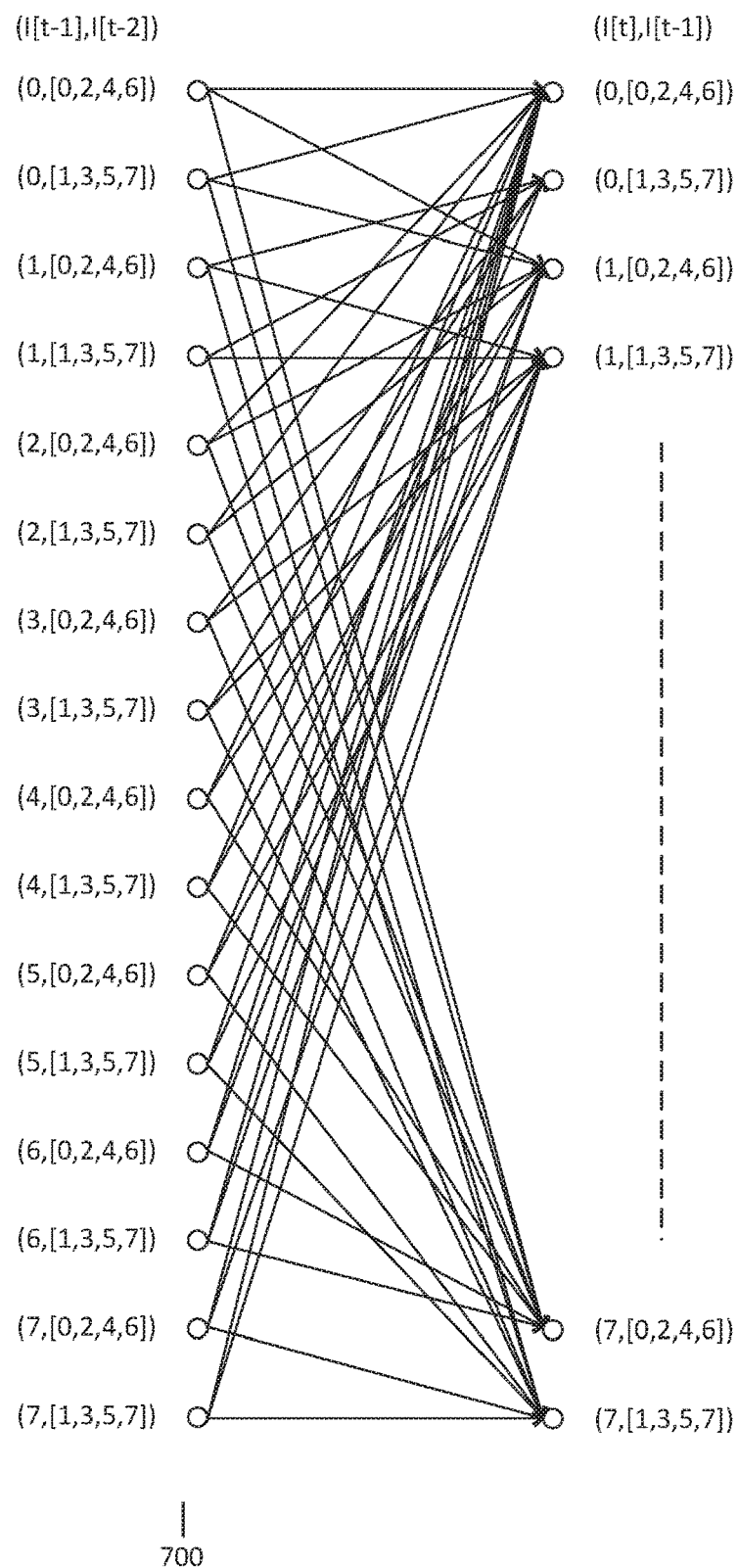
FIG. 7 illustrates a diagram of a modified trellis using reduced state sequence estimation (RSSE) for 8 PSK and a channel length $Q_d=2$, according to an embodiment of the present disclosure.

FIG. 7 illustrates a diagram of a modified trellis (sub-trellis) using RSSE for 8 PSK, according to an embodiment of the present disclosure.

Referring to FIG. 7, the modified trellis diagram 700 illustrates the branch metric (BM), which is a measure of the Euclidean distance between the symbol that was transmitted and the symbol that was received defined for each arc in the trellis, modified for partition P=[8,2] using tuple of states form and which may be represented by Equation (26) as follows:

$$PM(I[t], I[t-1]) = \qquad (26)$$

$$\min_{I[t-1]\in\{0,2,4,6\}, I[t-2]\in\{[0,2,4,6],[1,3,5,7]\}} \left\{ PM(I[t-1], I[t-2]) + \sum_{b=1}^{B} |y_b[t] - MTG_{t(\bmod 16)}(b, I[t]) - ISI_{t(\bmod 16)}(b, (I[t-1], \hat{I}[t-2]))|^2 \right\}$$

where $I[t] \in \{0, \ldots 7\}$, $I[t-1] \in \{0, \ldots 7\}$, $I[t-2] \in \{[0, 2, 4, 6], [1, 3, 5, 7]\}$.

Similarly, Equation (26) above may be implemented with reduced complexity LUTs and may be represented by Equation (27) as follows:

$$PM(I[t], I[t-1]) = \qquad (27)$$

$$\begin{cases} \min_{\substack{I[t-1]\in\{0,2,4,6\},\\ I[t-2]\in\{[0,2,4,6],\\ [1,3,5,7]\}}} \left\{ \sum_{b=1}^{B} \left| \begin{array}{c} PM(I[t-1], I[t-2]) + \\ y_b[t] - MTG_e(b, m(I[t], n)) - \\ ISI_e(b, (m(I[t-1], n), \\ m(\hat{I}[t-2], n))) \end{array} \right|^2 \right\} & t \text{ is even} \\ \min_{\substack{I[t-1]\in\{0,2,4,6\},\\ I[t-2]\in\{[0,2,4,6],\\ [1,3,5,7]\}}} \left\{ \sum_{b=1}^{B} \left| \begin{array}{c} PM(I[t-1], I[t-2]) + \\ y_b[t] - MTG_o(b, m(I[t], n)) - \\ ISI_o(b, (m(I[t-1], n), \\ m(\hat{I}[t-2], n))) \end{array} \right|^2 \right\} & t \text{ is odd} \end{cases}$$

The soft output results of the soft VA module 414 may be calculated using Equation (28) as follows:

$$L_i(b_i[t-\Delta]) = \qquad (28)$$

$$\min_{s_t, s_{t-1}|b_i[t-\Delta]=0}(STM(s_t, s_{t-1})) - \min_{s_t, s_{t-1}|b_i[t-\Delta]=1}(STM(s_t, s_{t-1}))$$

$$L_i(b_i[t-\Delta]) = \min_{I[t], I[t-2], I[t-1]|b_i[t-\Delta]=0}(STM(I[t], I[t-1], I[t-2])) -$$

$$\min_{I[t], I[t-2], I[t-1]|b_i[t-\Delta]=1}(STM(I[t], I[t-1], I[t-2]))$$

where the following notation is simplified: STM($s_t,s_{t-1}$)=STM((I[t],I[t−1]),(I[t−1],I[t−2]))=STM(I[t],I[t−1],I[t−2]). Intermediate variables called state transition metric (STM) and branch metric (BM) are defined. At each forward recursion, the STM and BM are updated.

The case where P=[$P_1$, $P_2$]=[8, 2] and I[t]={0, . . . 7} corresponds to the symbol at time instance t, I[t−1]= {0, . . . , 7}, and I[t−2]∈{[0,2,4,6], [1,3,5,7]}. When P=[$P_1$, $P_2$], $P_1$=8 is always selected, AS there is no ambiguity in determining $L_i(b_i[t-\Delta])$. In RSSE with different partitions, the present system uses Δ=1. In addition, LLR saturation based on the mean absolute value of the soft decision, T, may also performed according to Equation (29) as follows:

$$\tilde{L}_i(b_i[t]) = \max\{L_i(b_i[t]), 1.5T\} \qquad (29)$$

The mean absolute value of the soft decision may be computed according to Equation (30) as follows:

$$T = E[|L_i(b_i[t])|] \qquad (30)$$

Figure 8:
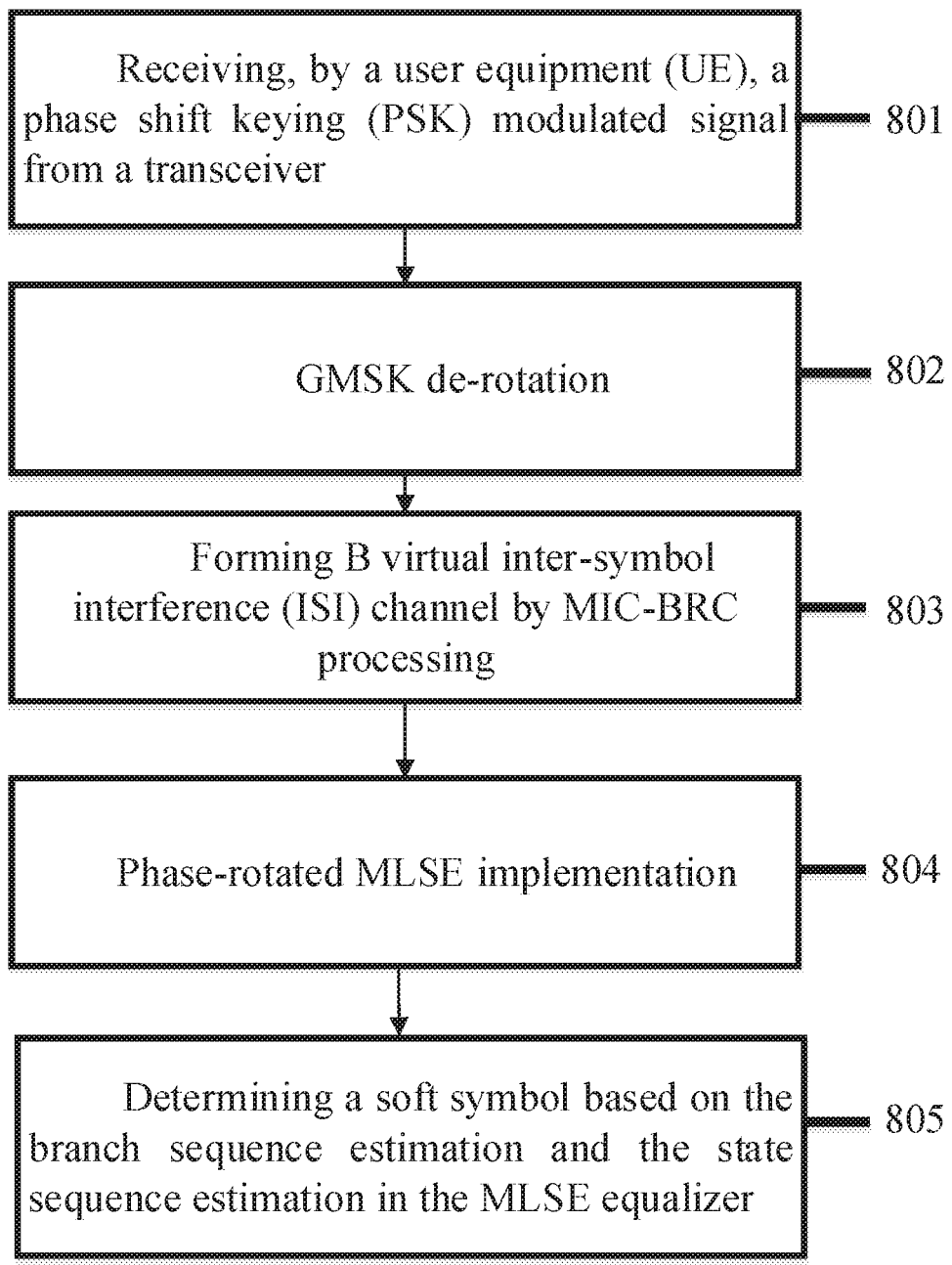
FIG. 8 is a flowchart of a method of determining a soft symbol based on an RBSE or an RSSE in an MLSE equalizer, according to an embodiment of the present disclosure.

FIG. 8 is a flowchart of a method of determining a soft symbol based on a branch sequence estimation and a state sequence estimation in an MLSE equalizer, according to an embodiment of the present disclosure.

Referring to the flowchart of FIG. 8, the present system, at 801, includes receiving, by a user equipment (UE), a phase shift keying (PSK) modulated signal from a transceiver. At 802, the method includes performing a GMSK de-rotation. At 803, the method includes forming B virtual inter-symbol interference (ISI) channels by MIC-BRC processing. At 804, the method includes performing a phase-rotated MLSE process. At 805, the method includes determining a soft symbol based on the branch sequence estimation and the state sequence estimation in the MLSE equalizer.

Figure 9:
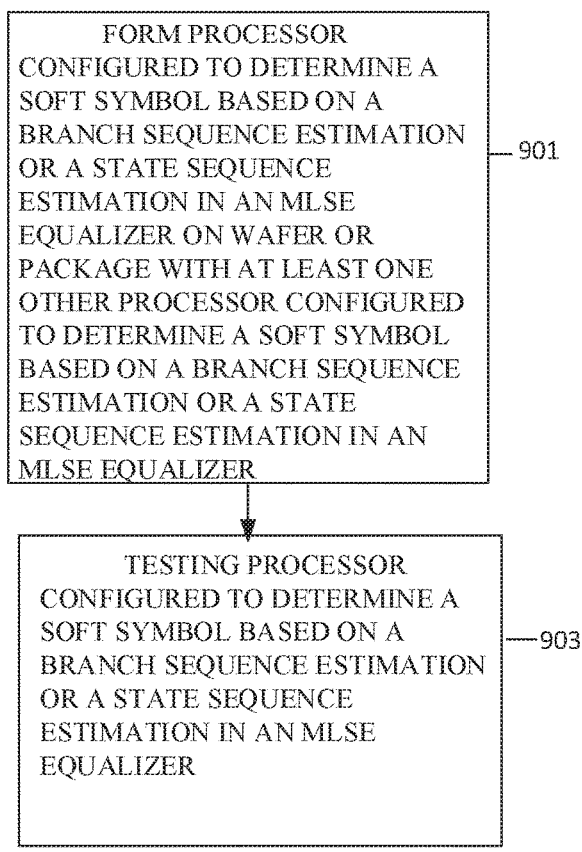
FIG. 9 is a flowchart of a method of testing a processor configured to determine a soft symbol based on an RBSE or an RSSE in an MLSE equalizer, according to an embodiment of the present disclosure.

FIG. 9 is a flowchart of a method of testing a processor configured to determine soft symbols according to an embodiment of the present disclosure, where the processor is either implemented in hardware or implemented in hardware that is programmed with software.

Referring to FIG. 9, the method, at 901, forms the processor as part of a wafer or package that includes at least one other processor. The processor is configured to receive, by a user equipment (UE), a phase shift keying (PSK) modulated signal from a transceiver, derotate the PSK modulated signal, form a virtual inter-symbol interference channel by means of mono interference cancellation (MIC) and branch combining (BRC) processing, input the PSK modulated signal to a phase-rotated maximum likelihood sequence estimator (MLSE) equalizer, wherein the MLSE equalizer includes a first main tap gain (MTG) look up table (LUT) and a first inter-symbol interference (ISI) LUT corresponding to even time samples and a second MTG LUT and a second ISI LUT corresponding to odd time samples, reduce one of a branch sequence estimation and a state sequence estimation in the MLSE equalizer, and determine a soft symbol based on the one of the reduced branch sequence estimation and the reduced state sequence estimation in the MLSE equalizer. At 903, the method tests the processor. Testing the processor includes testing the processor and the at least one other processor using one or more electrical to optical converters, one or more optical splitters that split an optical signal into two or more optical signals, and one or more optical to electrical converters.

Figure 10:
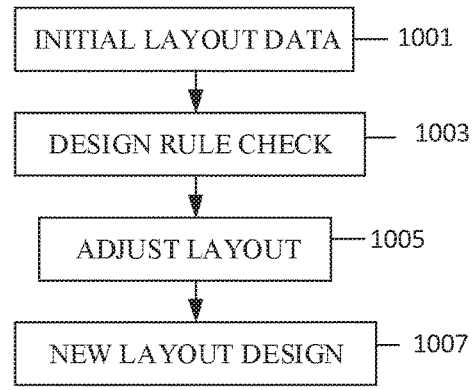
FIG. 10 is a flowchart of a method of manufacturing a processor configured to determine a soft symbol based on an RBSE or an RSSE in an MLSE equalizer, according to an embodiment of the present disclosure.

FIG. 10 is a flowchart of a method of manufacturing a processor configured to determine soft symbols, according to an embodiment of the present disclosure.

Referring to FIG. 10, the method, at 1001, includes an initial layout of data in which the method generates a mask layout for a set of features for a layer of an integrated circuit. The mask layout includes standard cell library macros for one or more circuit features that include a processor. The processor is configured to receive, by a user equipment (UE), a phase shift keying (PSK) modulated signal from a transceiver, derotate the PSK modulated signal, form a virtual inter-symbol interference channel by means of mono interference cancellation (MIC) and branch combining (BRC) processing, input the PSK modulated signal to a phase-rotated maximum likelihood sequence estimator (MLSE) equalizer, wherein the MLSE equalizer includes a first main tap gain (MTG) look up table (LUT) and a first inter-symbol interference (ISI) LUT corresponding to even time samples and a second MTG LUT and a second ISI LUT corresponding to odd time samples, reduce one of a branch sequence estimation and a state sequence estimation in the MLSE equalizer, and determine a soft symbol based on the one of the reduced branch sequence estimation and the reduced state sequence estimation in the MLSE equalizer.

At 1003, there is a design rule check in which the method disregards relative positions of the macros for compliance to layout design rules during the generation of the mask layout.

At 1005, there is an adjustment of the layout in which the method checks the relative positions of the macros for compliance to layout design rules after generating the mask layout.

At 1007, a new layout design is made, in which the method, upon detection of noncompliance with the layout design rules by any of the macros, modifies the mask layout by modifying each of the noncompliant macros to comply with the layout design rules, generates a mask according to the modified mask layout with the set of features for the layer of the integrated circuit and manufactures the integrated circuit layer according to the mask.

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. A method, comprising:
    receiving, by a user equipment (UE), a phase shift keying (PSK) modulated signal from a transceiver;
    derotating the PSK modulated signal;
    equalizing the PSK modulated signal using a maximum likelihood sequence estimator (MLSE) based on a first main tap gain (MTG) look up table (LUT) and a first inter-symbol interference (ISI) LUT corresponding to even time samples and a second MTG LUT and a second ISI LUT corresponding to odd time samples;
    multiplexing the even and odd MTG time samples; and
    multiplexing the even and odd ISI time samples,
    wherein the MLSE receives the multiplexed even and odd ISI time samples through an ISI multiplexor and the multiplexed even and odd MTG time samples through an MTG multiplexor in order to generate a soft value.

2. The method of claim 1, further comprising:
    reducing one of a branch sequence estimation and a state sequence estimation in the MLSE; and
    determining a soft symbol based on the one of the reduced branch sequence estimation and the reduced state sequence estimation in the MLSE,
    wherein the MLSE reduces the state sequence estimation by partitioning candidate symbols according to a Euclidian distance between the symbols.

3. The method of claim 1, wherein the MLSE uses a log-likelihood ratio saturation process.

4. The method of claim 1, wherein the MLSE derotates the PSK modulated signal by an integer multiple of $\pi/4$.

5. The method of claim 1, wherein the PSK modulated signal is received by a UE that includes single antenna interference cancelation processing.

6. The method of claim 2, wherein the branch sequence estimation is reduced to two branches.

7. The method of claim 1, wherein the first MTG LUT, the first ISI LUT, the second MTG LUT, and the second ISI LUT are updated with new values when channel estimation is performed and channel state information is updated.

8. The method of claim 1, wherein the MLSE executes a soft Viterbi algorithm.

9. The method of claim 8, wherein the soft Viterbi algorithm receives the multiplexed even and odd ISI time samples through the ISI multiplexor and the multiplexed even and odd MTG time samples through the MTG multiplexor.

10. The method of claim 1, wherein the UE transmits and receives signals corresponding to at least one of global system for mobile communication (GSM), general packet radio service (GPRS), enhanced data rates for GSM evolution (EDGE), long term evolution (LTE), fifth generation (5G), long term evolution advanced (LTE-A), code division multiple access (CDMA), wideband code division multiple access (WCDMA), and universal mobile telecommunications system (UMTS).

11. An apparatus, comprising:
    a processor; and
    a receiver configured to:
        receive a phase shift keying (PSK) modulated signal from a transceiver,
        derotate the PSK modulated signal,
        input the PSK modulated signal to a maximum likelihood sequence estimator (MLSE), wherein the MLSE includes a first main tap gain (MTG) look up table (LUT) and a first inter-symbol interference (ISI) LUT corresponding to even time samples, and a second MTG LUT and a second ISI LUT corresponding to odd time samples, multiplex the even and odd MTG time samples, and multiplex the even and odd ISI time samples, wherein the MLSE receives the multiplexed even and odd ISI time samples through an ISI multiplexor and the multiplexed even and odd MTG time samples through an MTG multiplexor in order to generate a soft value.

12. The apparatus of claim 11, wherein the receiver is further configured to:

reduce a branch sequence estimation in the MLSE, or reduce a state sequence estimation in the MLSE, and determine a soft symbol based on the branch sequence estimation or the state sequence estimation in the MLSE, wherein the MLSE reduces the state sequence estimation by partitioning candidate symbols according to a Euclidian distance between the symbols.

13. The apparatus of claim 11, wherein the MLSE uses a log-likelihood ratio saturation process.

14. The apparatus of claim 11, wherein the MLSE derotates the PSK modulated signal by an integer multiple of $\pi/4$.

15. The apparatus of claim 11, the receiver includes single antenna interference cancelation processing.

16. The apparatus of claim 12, wherein the branch sequence estimation is reduced to two branches.

17. The apparatus of claim 11, wherein the first MTG LUT, the first ISI LUT, the second MTG LUT, and the second ISI LUT are updated with new values when channel estimation is performed and channel state information is updated.

18. The apparatus of claim 11, wherein the MLSE executes a soft Viterbi algorithm.

19. The apparatus of claim 18, wherein the soft Viterbi algorithm receives the multiplexed even and odd ISI time samples through the ISI multiplexor and the multiplexed even and odd MTG time samples through the MTG multiplexor.

20. A method of manufacturing a processor, comprising:

forming the processor as part of a wafer or package that includes at least one other processor, wherein the processor is configured to receive, by a user equipment (UE), a phase shift keying (PSK) modulated signal from a transceiver, derotate the PSK modulated signal, and input the PSK modulated signal to a phase-rotated maximum likelihood sequence estimator (MLSE), wherein the MLSE includes a first main tap gain (MTG) look up table (LUT) and a first inter-symbol interference (ISI) LUT corresponding to even time samples and a second MTG LUT and a second ISI LUT corresponding to odd time samples, wherein the MLSE is configured to multiplex the even and odd MTG time samples, and multiplex the even and odd ISI time samples, and wherein the MLSE receives the multiplexed even and odd ISI time samples through an ISI multiplexor and the multiplexed even and odd MTG time samples through an MTG multiplexor in order to generate a soft value.

21. A method of constructing an integrated circuit, comprising:

generating a mask layout for a set of features for a layer of the integrated circuit, wherein the mask layout includes standard cell library macros for one or more circuit features that include a processor configured to receive, by a user equipment (UE), a phase shift keying (PSK) modulated signal from a transceiver, derotate the PSK modulated signal, and input the PSK modulated signal to a phase-rotated maximum likelihood sequence estimator (MLSE), wherein the MLSE includes a first main tap gain (MTG) look up table (LUT) and a first inter-symbol interference (ISI) LUT corresponding to even time samples and a second MTG LUT and a second ISI LUT corresponding to odd time samples, wherein the MLSE is configured to multiplex the even and odd MTG time samples, and multiplex the even and odd ISI time samples, and wherein the MLSE receives the multiplexed even and odd ISI time samples through an ISI multiplexor and the multiplexed even and odd MTG time samples through an MTG multiplexor in order to generate a soft value.

* * * * *